Patented May 25, 1937

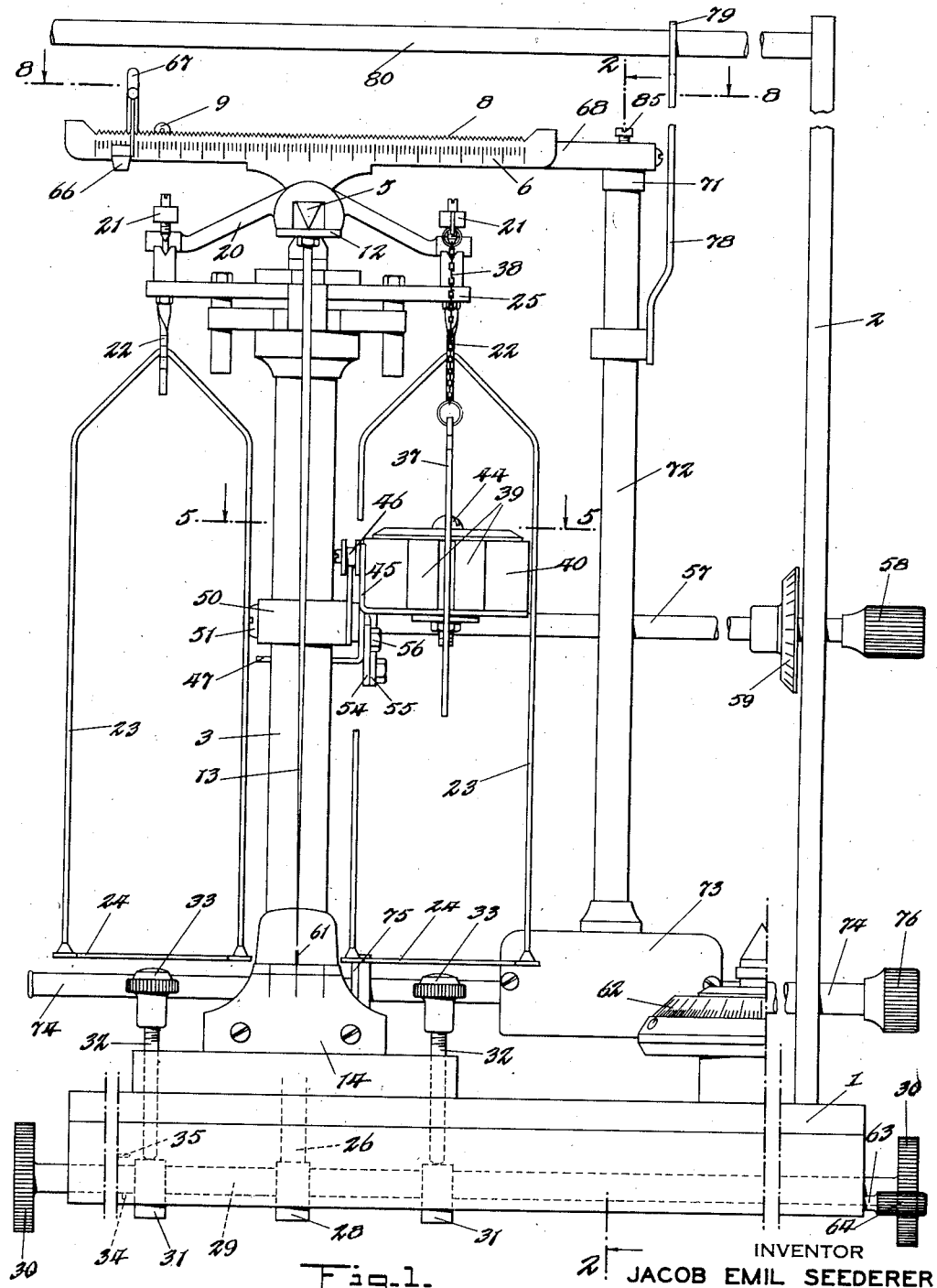

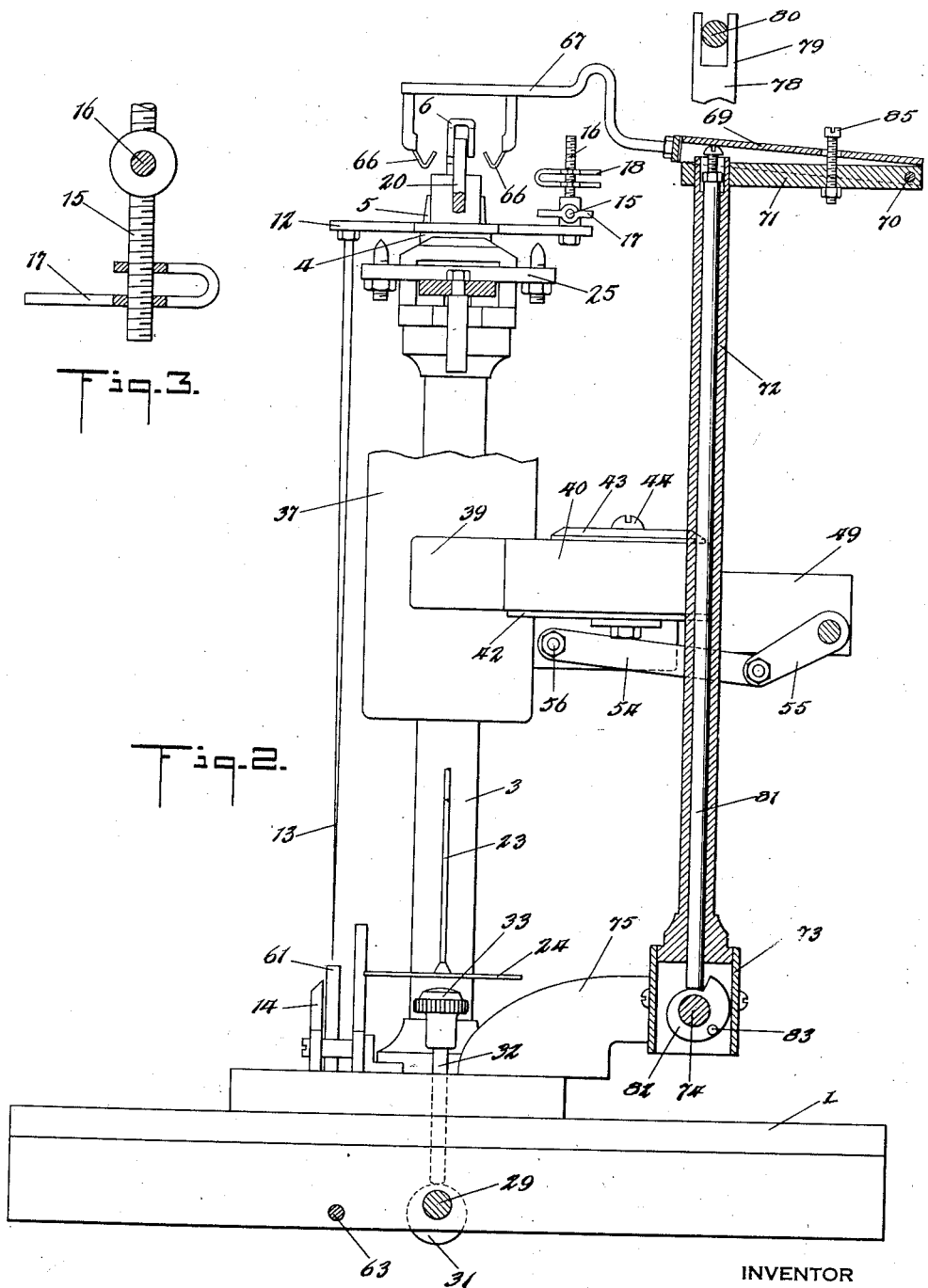

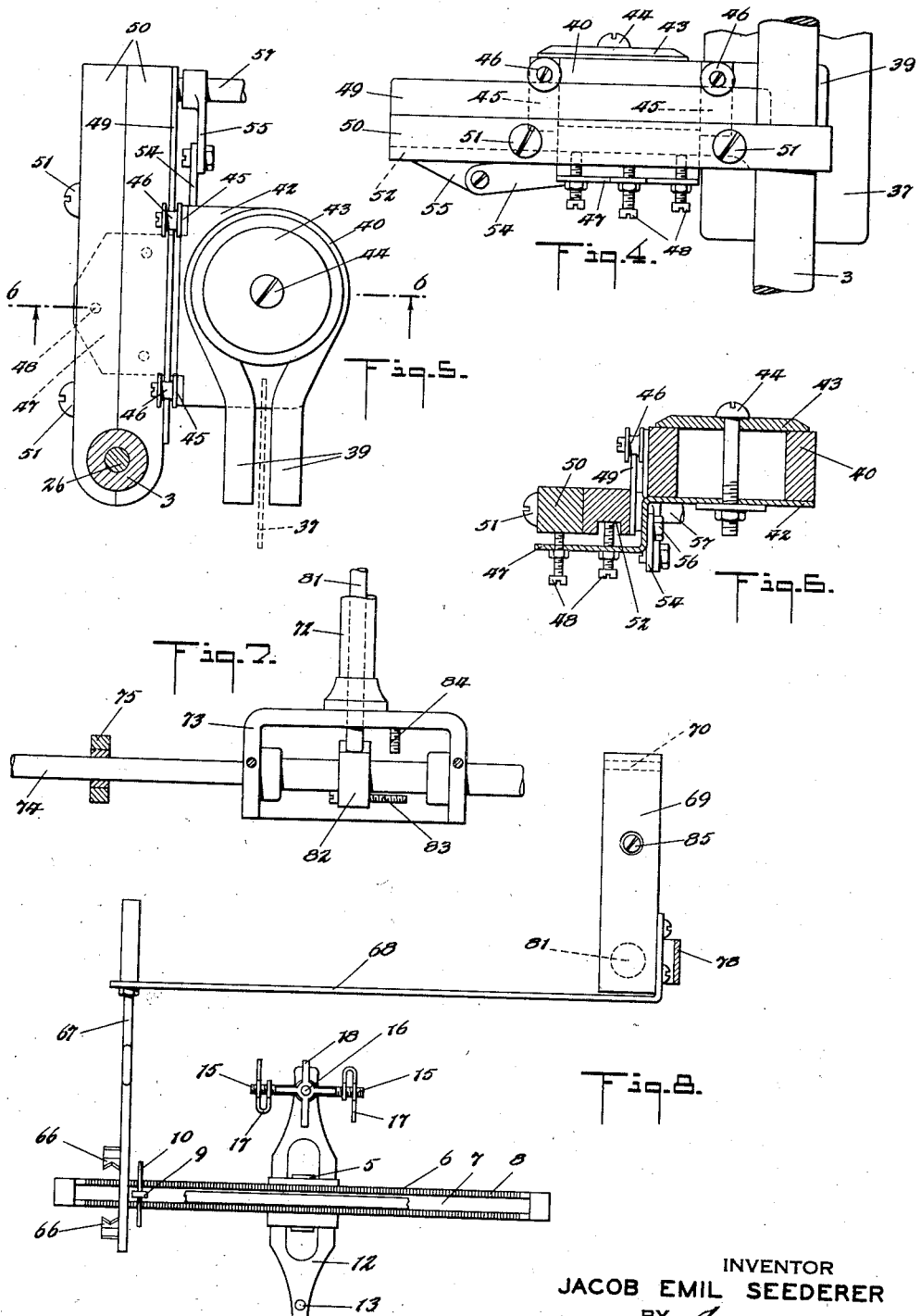

2,081,252

UNITED STATES PATENT OFFICE 2,081,252

PRECISION BALANCE

Jacob Emil Seederer, Bloomfield, N. J., assignor to Seederer-Kohlbusch, Inc., Jersey City, N. J., a corporation of New Jersey Application February 1, 1934, Serial No. 709,283

14 Claims. (Cl. 265—54)

This invention relates to balances and has for its object to provide an improved precision balance for quickly and accurately weighing objects of relatively small mass.

The operation of analytical balances, such as micro-chemical balances which may be sensitive to one one-thousandth of a milligram, is a task which consumes much time and energy because the parts are delicately balanced and require various careful adjustments with each weighing operation.

The operation of such balances has been greatly simplified by the magnetic damper of Gattoni Patent #1,900,641, dated March 7, 1933, which brings the beam to rest in a few seconds without affecting the sensitivity and accuracy of the balance, and by the indicator disclosed in Gattoni application Serial No. 630,229, filed August 24, 1932, which enables a reading to be taken without eye strain as soon as the pointer comes to rest; but it is still necessary to adjust the moving poises, operate the pan rests, and adjust the equilibrium and sensitivity of the beam when required, and it is my object to simplify these operations and thereby further reduce the time and energy expended in the use of such apparatus.

In most balances the moving poise or poises on the beam are controlled by a shaft which extends through the upper end of the case and is tiresome to operate because it requires the operator to raise his arm and to some extent shift his position each time an adjustment is made. I obviate this difficulty by means of a novel poise control which can be operated without raising the arm from the table or even shifting the eyes from the beam. Another common fault has been the lack of adequate means for adjusting the equilibrium and sensitivity of the beam, and I simplify such adjustments by means of beam weights which are readily accessible, quickly and easily adjusted and so constructed that they cannot be shifted by vibrations of the beam or by accidental jars. Another feature is an improved pan and beam rest control which is readily accessible and operable from either side of the case and is correlated with the poise control and other adjusting mechanisms with a view to simplifying and expediting the weighing operation.

These and other features and advantages of the invention will be described in connection with the accompanying drawings, in which:

Fig. 1 is a partly broken away front elevation of a micro-chemical balance embodying the invention;

Fig. 2 is a vertical section taken on line 2—2 of Fig. 1 with parts of the pan suspension mechanism omitted;

Fig. 3 is a detail view of an adjustable weight for varying the equilibrium of the beam;

Fig. 4 is a side view of an improved magnet adjusting mechanism;

Fig. 5 is a horizontal section on line 5—5 of Fig. 1, looking at the top of the magnet and adjusting mechanism;

Fig. 6 is a transverse section taken on line 6—6 of Fig. 5;

Fig. 7 is a detail view of the mechanism for operating the grips which move the poises on the beam; and Fig. 8 is a horizontal section taken on line 8—8 of Fig. 1.

The balance shown in the drawings has a base 1 supporting case 2 which encloses the mechanism and is provided with transparent windows in accordance with the usual practice in balances of this type. The base supports standard 3 having a knife edge bearing 4 carrying the central knife edge 5 of beam 6 as shown in Figs. 1 and 2.

Beam 6 has a longitudinal slot 7 and notches 8 graduated frm 0 to 100. A movable poise 9 having spindles 10 is adapted to fit in these notches as shown in Figs. 1 and 8. The beam has a forwardly and rearwardly extending arm 12 adjacent knife edge 5. The forward end of this arm carries pointer 13 which moves over scale 14.

The rear end of arm 12 carries threaded pins 15 which extend on opposite sides of knife edge 5 parallel to the beam, and a threaded pin 16 in line with said knife edge and perpendicular to the plane of the beam. Tiny weights 17 consisting of strips of spring steel or other resilient material bent in the form of a U have both legs of the U threaded on pins 15, and a similar weight 18 preferably having cross or star-shaped extensions on the legs of the U is threaded on pin 16, as shown in Figs. 2, 3 and 8. Adjustment of weights 17 on pins 15 changes the equilibrium of the balance and adjustment of weight 18 on pin 16 changes its sensitivity. These weights are easily adjusted and, owing to the resiliency of the material which tends to spread the legs of the U, they grip the threads of pins 15 and 16 and remain in adjusted position whereas other types of weights are easily shifted by vibrations of the beam or by accidental jars.

The beam 6 has depending arms 20 carrying end knife edges on which rest the knife edge bearings of yoke frames 21. These yoke frames carry pivoted hooks 22 which support the bows 23 of weighing pans 24. The standard 3 also supports the usual bridge or cradle 25 which is raised and lowered by vertical plunger 26 within the standard for the purpose of lifting beam 6 and yoke frames 21 off their respective knife edge bearings when the weights and materials are being placed in and removed from pans 24 or when the balance is not in use. Plunger 26 is actuated by a cam 28 carried by rotatable shaft 29 which extends through the bottom of the case and is rotated by knobs 30 which are conveniently located at the right and left ends of the case where they can be rotated without raising the hand from the table, as indicated in Fig. 1. Shaft 29 also carries cams 31 operating vertical plungers 32 having rests 33 which are adapted to contact with the bottom of pans 24 when the plungers are raised by rotation of the shaft. Rotation of the shaft is limited in any suitable manner as by pin 34 which is carried by the shaft and is adapted to contact with a stop 35 mounted on the frame as shown in Fig. 1.

The balance is also provided with a magnetic damper consisting of an aluminum or other non-magnetic damping plate 37 which is suspended by light chains 38 from the yoke frame 21 at one end of the beam and is adapted to move up and down between the closely spaced poles 39 of magnet 40 as broadly disclosed in Gattoni Patent #1,900,641. In this manner swinging movements of pan bows 23 are isolated from the damping plate and the damping plate is prevented from striking against the poles of the magnet which would seriously affect the sensitivity and accuracy of the balance. The eddy currents set up by moving plate 37 through the magnetic field dampen the motion of the beam and bring the balance to rest in a few seconds.

I also provide improved means for adjusting magnet 40 with respect to the damping plate to vary the damping effect, adjustability being desirable as the damping effect may vary under different load conditions and also because some operators prefer to let the balance swing for a longer or shorter time than others. In the form illustrated, magnet 40 is clamped between supporting plate 42 and disc 43 by bolt 44 which may be loosened to permit the magnet to be moved and its poles aligned with the damping plate. The magnet support 42 has upstanding ears 45 carrying rollers 46 and also has a depending flange 47 which is preferably parallel to support 42 and provided with vertical adjusting screws 48 as shown in Figs. 4, 5 and 6. Rollers 46 track on horizontal flange 49 carried by one of two mating clamp members 50 which are held together around standard 3 by screws 51, while screws 48 contact with and ride on the underside of clamp members 50, two of said screws 48 tracking in a longitudinal groove or guideway 52 formed in one of the clamp members as best shown in Figs. 4 and 6. Screws 48, when adjusted, cause support 42 and magnet 40 to rotate slightly in a vertical plane, making it possible to maintain the poles of the magnet in perfect vertical alignment with the damping plate. The magnet is adjusted back and forth by pivoted lever arms 54, 55 the former of which is pivoted at 56 to magnet support 42 and the latter of which is secured to rotatable shaft 57 which is journaled in flange 49 and extends outside case 2 where it is operated by knob 58 as shown in Fig. 1. Shaft 57 carries a graduated dial 59 cooperating with a line or arrow on the inside of the case, enabling the damping effect to be predetermined according to the position of the dial.

The balance has an indicator 61 which is adapted to be moved into alignment with pointer 13, and a rotatable graduated dial 62, both of which are moved by rotatable shaft 63 having an operating knob 64 located outside the case adjacent knob 30. The operating connections between indicator 61, dial 62 and shaft 63 are omitted in order to simplify the showing as they are fully disclosed in the above-mentioned Gattoni application Serial No. 630,229. When pointer 13 comes to rest knob 64 is turned until indicator 61 is brought into alignment with the pointer, which can be accomplished almost instantaneously, after which the operator simply takes the reading from dial 62 and adds it to or subtracts it from the reading of beam 6 according to the position of poise 9.

Poise 9 is lifted and moved longitudinally of beam 6 by spaced V-shaped grips 66 carried by arm 67 which is mounted on a bar 68 extending parallel to the plane of the beam. Bar 68 is carried by plate 69 which is hinged at 70 to a second plate 71 mounted on vertical tube 72 as shown in Figs. 1, 2 and 8. Tube 72 is supported by housing 73 carried by horizontal shaft 74 which is slidably mounted in bracket 75 and extends through the end of case 2 adjacent the bottom thereof as shown in Figs. 1 and 2. Shaft 74 is operated by knob 76 and is journaled in housing 73 as shown in Fig. 7 so that it may be rotated with respect to the housing but carries the housing with it when moved in a longitudinal direction parallel to the plane of the beam. Housing 73 and vertical tube 72 are held against rotation and guided in their longitudinal movement by an extension 78 which is carried by the tube and has a forked upper end 79 straddling a horizontal rod 80 which is secured to the upper ends of case 2 as shown in Figs. 1 and 2. Plate 69, and consequently bar 68, arm 67 and grips 66, which are carried by plate 69, are adapted to be raised and lowered by plunger 81 which is mounted in tube 72. The lower end of plunger 81 rests on cam 82 carried by shaft 74 within housing 73 while the upper end of the plunger contacts with plate 69 as shown in Figs. 2 and 7. Rotation of shaft 74 and cam 82 is limited by cooperating stops 83 and 84 as shown in Fig. 7, and the upward movement of plate 69 may be further limited to any desired extent by adjusting screw 85 which extends through plates 69 and 71 and limits their separation as shown in Fig. 2.

In order to shift poise 9 longitudinally of beam 6, the operator rotates knob 76 until the parts assume the position shown in Figs. 1 and 2 where the grips 66 are beneath the level of spindles 10 of the poise. He next slides shaft 74 longitudinally until the grips 66 arrive directly underneath spindles 10 of the poise and then rotates shaft 74 in a clockwise direction as viewed in Fig. 2, thereby raising plunger 81, plate 69, arm 67 and grips 66 which will lift the poise by its spindles until it clears the top of beam 6. Shaft 74 is then moved longitudinally, and rotated in a counter-clockwise direction as viewed in Fig. 2, until the poise is deposited in any desired notch 8. The beam may, of course, carry a plurality of poises which may be shifted in the same manner as when a single poise is used. Hence the above mechanism enables the operator to adjust the poise or poises by means of knob 76 without raising his arm from the table and without shifting his position or even moving his eyes from the beam. By also grouping and correlating the rest and dial control knobs 30 and 64 at the bottom of the case, in the same accessible position as knob 76, the weighing operation is further simplified and a considerable saving in time is effected.

Various changes may be made in the details of construction herein shown and described without departing from the scope of the appended claims.

The invention claimed is:

1. In a balance, a support, a beam pivoted on said support, a poise movable on said beam, a control member adjacent the bottom of said support, and means controlled by said member for moving said poise, said means including an upright extending upward from said control member to the region of said beam and movable bodily adjacent to said beam to effect adjustments of said poise.

2. In a balance, a beam, a poise movable on said beam, a rotatable and longitudinally movable shaft below said beam, an arm adjacent said beam for lifting and moving said poise, means controlled by the rotation of said shaft for raising and lowering said arm, and means controlled by the longitudinal movement of said shaft for moving said arm longitudinally of said beam.

3. In a balance, a beam, a poise movable on said beam, a rotatable and longitudinally movable shaft below said beam, a support journaled and supported on said shaft, means for guiding said support longitudinally of said beam, an arm carried by said support adjacent said beam for lifting and moving said poise, and means controlled by the rotation of said shaft for raising and lowering said arm.

4. In a balance, a beam, a poise movable on said beam, a rotatable and longitudinally movable shaft below said beam, an upright tube carried by said shaft, a plunger in said tube, means for moving and guiding said tube bodily longitudinally of said beam, a bar pivoted on said tube and adapted to be raised by said plunger, means carried by said bar adjacent to said beam for lifting and moving said poise, and means controlled by the rotation of said shaft for raising and lowering said plunger.

5. In a balance, a beam, a poise movable on said beam, a rotatable and longitudinally movable shaft below said beam, an upright tube carried by said shaft, and movable therewith bodily lengthwise of the beam, a plunger in said tube, a rod parallel to said beam, an extension on said tube tracking on said rod to guide said tube and maintain it in upright position, a bar pivoted on said tube and lying above said plunger, an arm carried by said bar adjacent said beam for lifting and moving said poise, and means controlled by the rotation of said shaft for raising and lowering said plunger.

6. In a balance, a case, a support in said case, a beam pivoted on said support, a poise movable on said beam, a rotatable and longitudinally movable shaft extending lengthwise of said beam adjacent the bottom of said case and projecting outside said case, an arm adjacent said beam for lifting and moving said poise, means controlled by the rotation of said shaft for raising and lowering said arm, and means controlled by the longitudinal movement of said shaft for moving said arm longitudinally of said beam.

7. In a balance, a case, a support in said case, a beam pivoted on said support, a poise movable on said beam, a rotatable and longitudinally movable shaft extending lengthwise of said beam adjacent the bottom of said case and projecting outside said case, a tube carried by said shaft, a plunger in said tube, a rod parallel to said beam, an extension on said tube tracking on said rod to guide said tube and prevent it from rotating, a bar pivoted on said tube and lying above said plunger, an arm carried by said bar adjacent said beam for lifting and moving said poise, and a cam on said shaft for raising and lowering said plunger.

8. A poise shifting device for precision balances comprising a shaft, an upright journaled and supported on said shaft, an arm carried by said upright for lifting and moving a poise, and means controlled by the rotation of said shaft for raising and lowering said arm.

9. A poise shifting device for precision balances comprising a shaft, an upright tube journalled and supported on said shaft, a plunger in said tube, means controlled by the rotation of said shaft for raising and lowering said plunger, and an arm adapted to be raised by said plunger for lifting a poise in a direction exactly reciprocal to that of the force exerted on said poise by gravity.

10. A poise shifting device for precision balances comprising a shaft, an upright tube journaled and supported on said shaft, an extension on said tube for engaging a track, a plunger in said tube, means controlled by the rotation of said shaft for raising and lowering said plunger, a bar pivoted on said tube and lying above said plunger, and an arm carried by said bar for lifting and lowering a poise directly in the line of gravitational force.

11. An adjustable weight for a balance comprising a bent strip of flexible material flexed to spread and means for threading portions on opposite sides of the bend upon a support.

12. An adjustable weight for a balance comprising a strip of flexible material bent in the shape of a U, flexed in a direction to spread the legs of the U and having both arms of the U threaded for engagement with a threaded support.

13. In a balance, a pivoted beam, threaded pins carried by said beam perpendicularly and parallel thereto adjacent the pivot point, and adjustable weights comprising bent strips of flexible material flexed to spread and having portions on both sides of the bends threaded on said pins.

14. In a balance, a beam, a poise movable on said beam, a rotatable and longitudinally movable shaft below said beam, means for lifting said poise, and means connecting said poise lifting means with the shaft for lifting the poise upon rotation of the shaft, said connecting means being movable bodily with said shaft for moving said poise along the beam.

JACOB EMIL SEEDERER.